Aug. 29, 1967     G. A. MANGOLETSI     3,338,568
APPARATUS FOR SUPPLYING AN AIR/FUEL MIXTURE FROM A CARBURETOR
SYSTEM TO AN INTERNAL COMBUSTION ENGINE
Filed May 19, 1966     4 Sheets-Sheet 1

INVENTOR
George Alexander Mangoletsi
BY
Stevens, Davis, Miller & Mosher
ATTORNEYS Aug. 29, 1967  G. A. MANGOLETSI  3,338,568
APPARATUS FOR SUPPLYING AN AIR/FUEL MIXTURE FROM A CARBURETOR
SYSTEM TO AN INTERNAL COMBUSTION ENGINE
Filed May 19, 1966  4 Sheets-Sheet 2

INVENTOR
George Alexander Mangoletsi
BY
Stevens, Davis, Miller & Mosher  ATTORNEYS INVENTOR
George Alexander Mangoletsi INVENTOR
George Alexander Mangoletsi Stevens, Davis, Miller & Mosher
ATTORNEYS

United States Patent Office 3,338,568
Patented Aug. 29, 1967

3,338,568
APPARATUS FOR SUPPLYING AN AIR/FUEL MIXTURE FROM A CARBURETOR SYSTEM TO AN INTERNAL COMBUSTION ENGINE
George Alexander Mangoletsi, Knutsford, England, assignor to The Zenith Carburetter Company Limited, Stanmore, Middlesex, England
Filed May 19, 1966, Ser. No. 551,287
Claims priority, application Great Britain, May 29, 1965, 13,190/65
4 Claims. (Cl. 261—145)

This invention relates to fuel/air mixture intake systems for internal combustion engines. By "fuel/air mixture intake" system we mean the arrangements of conduits, throttle valves and other parts by means of which the mixture of fuel and air created in a carburetor or carburetors is conveyed to and distributed between the engine cylinders and by which the quantity of such mixture is controlled.

The continuing increase in power output requirements of internal combustion engines has led to carburetor and inlet pipe or manifold sections of large diameters in order to feed a sufficiency of mixture to enable engines to attain their greatest power development at maximum revolutions. Modern engines are now designed to revolve at much higher rates than hitherto, and this tendency will undoubtedly continue thus requiring larger and larger pipes, manifolds and carburetors to be used.

Large diameter bores on the breathing side of an engine undoubtedly allow the above-mentioned objects to be achieved, but, unfortunately, at low and intermediate engine speeds, the air speed through the large bores is too low effectively to keep the fuel content of the mixture in suspension and bad distribution is the result, causing indifferent performance, carburation flat spots, fuel wastage, and incomplete combustion.

Lately certain steps have been taken by carburetor designers to eliminate the ill-effects of large bore carburetors on small and part throttle operation, mainly by the use of multi-choke instruments. This method, however, still requires a large bore manifold and is therefore only partly effective. The object of this invention is to provide means for improving the transference of the mixture from the carburetor to the combustion chambers.

Carburation systems in common use today consist basically of a carburetor (single or multi-choke) with butterfly throttle, and a large bore manifold.

According to the present invention, in a fuel/air mixture intake system for an internal combustion engine the carburetor is connected to the inlet port or ports of the engine cylinder or cylinders by conduits which form two conduit systems in parallel, a heating unit being provided to heat fuel/air mixture passing through one of the conduit systems and throttle valves being provided one of which controls the flow of fuel/air mixture in the conduit system with which the heating unit is associated and the other of which controls the flow of fuel/air mixture in the other conduit system in such a way that that system is kept closed until the first throttle valve is approaching its fully open position.

Preferably, the conduit system with which the heating unit is associated comprises conduits of smaller cross-sectional area than the conduits comprising the other conduit system.

Conveniently, the conduit system with which the heating means is associated comprises a conduit branching from and returning to the other conduit system and the two throttle valves are both mounted in the said other conduit system, one of them being positioned between the points at which the conduit system with which the heating unit is associated branches from and returns to the said other conduit system.

Alternatively, each of the throttle valves is mounted in the conduit system in which it controls the flow of fuel/air mixture.

The invention is hereinafter described with reference to the accompanying drawings, in which.

Figure 1:
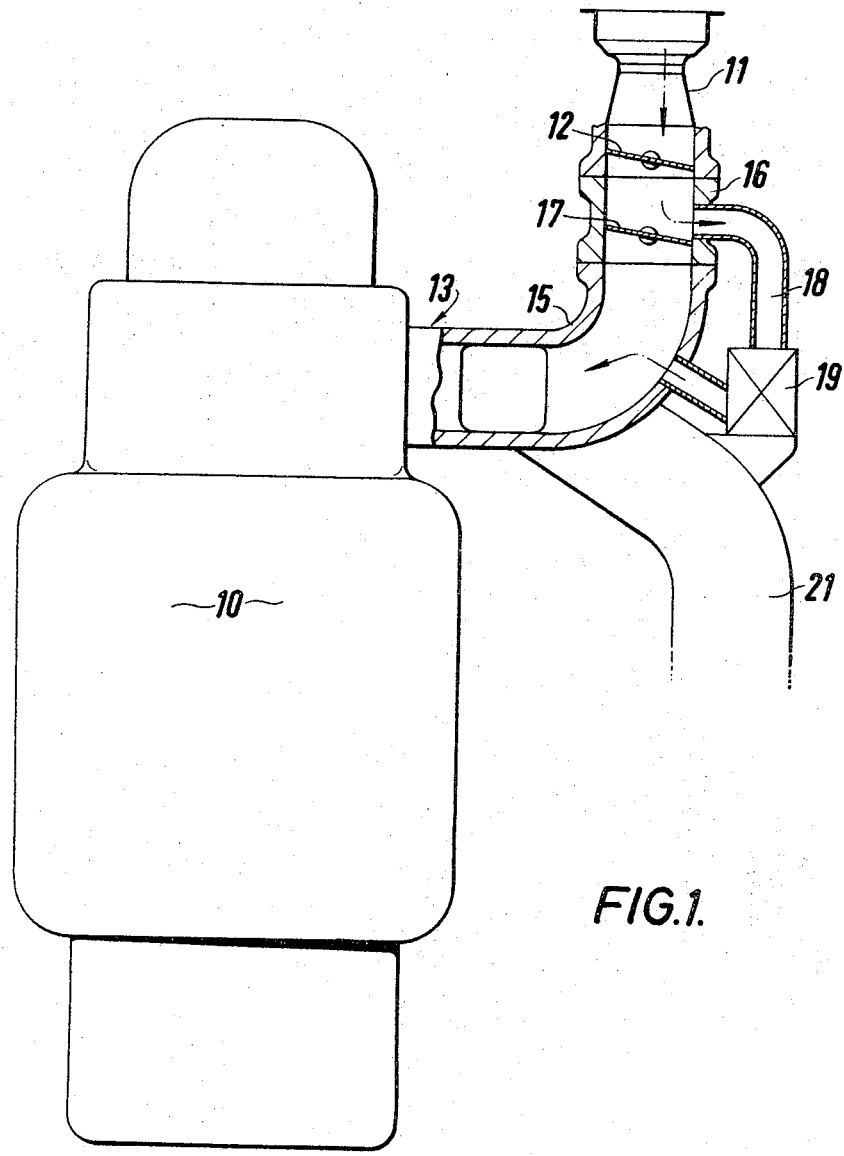
FIGURE 1 is a diagrammatic end view, partly in section, of an internal combustion engine to which is fitted one arrangement of fuel/air mixture intake system according to the invention.
Figure 2:
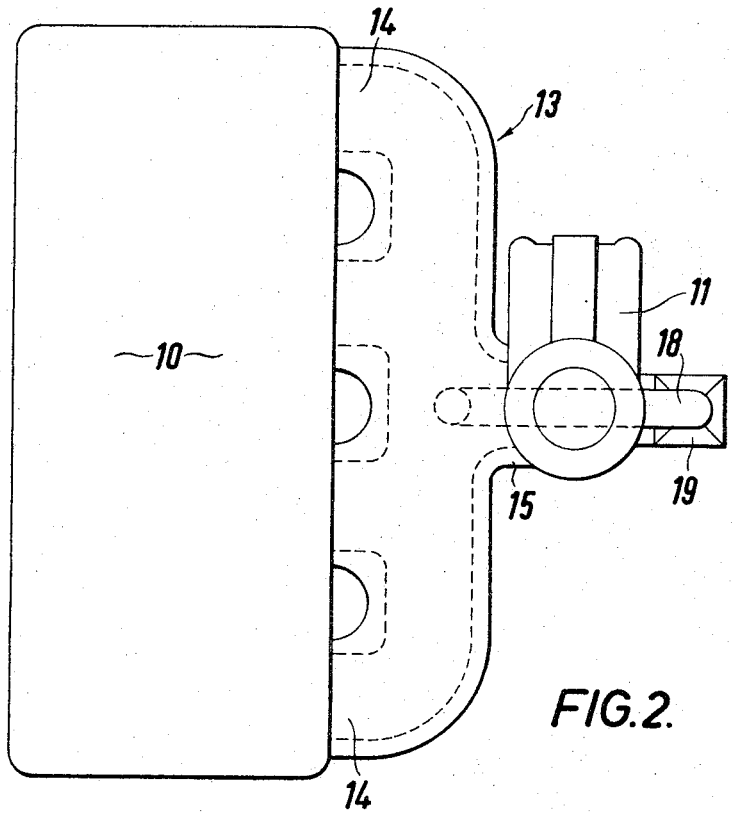
FIGURE 2 is a plan view of the arrangement shown in FIGURE 1.

Referring to FIGURES 1 and 2 of the drawings, an internal combustion engine is indicated at 10. Fuel/air mixture for the engine is produced in a carburetor 11 in the mixture passage of which is mounted a butterfly throttle valve 12. An inlet manifold 13 having branches 14 leading to the inlet ports of the engine cylinders includes an inlet conduit 15 to which fuel/air mixture from the carburetor 11 flows through a throttle unit 16, in which is mounted a second butterfly throttle valve 17. A conduit 18 of smaller cross section than that of the inlet conduit 15 branches from the barrel of the throttle unit 16 at a point above the trailing edge of the second throttle valve 17 and returns into the conduit 15 nearer to the outlet end of the latter. A heating unit 19 obtaining heat from the exhaust pipe 21 of the engine, is provided to heat the fuel/air mixture passing through the conduit 18.

Figure 3:
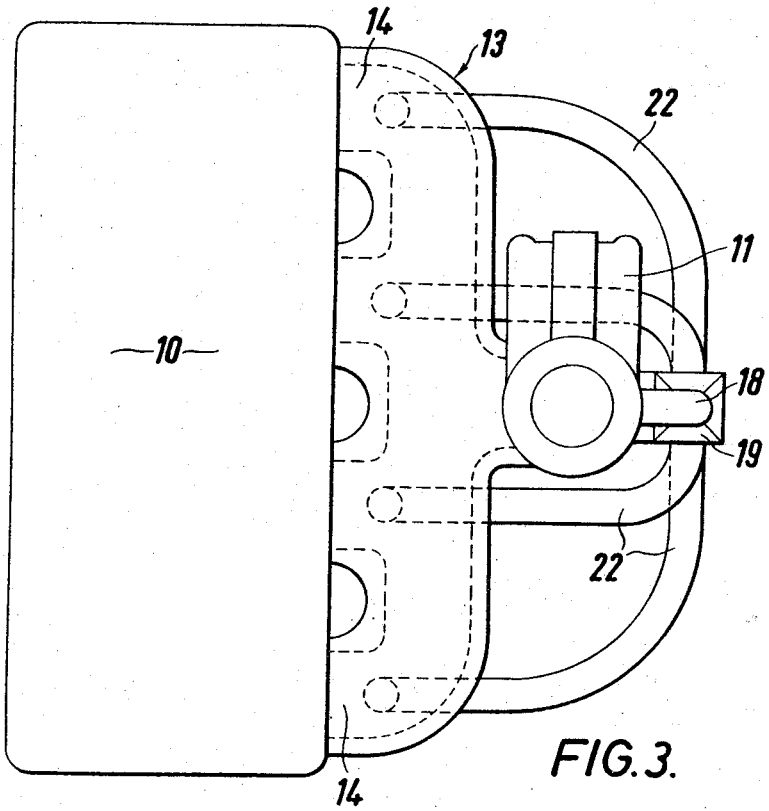
FIGURE 3 is a plan view of a modified arrangement.

As shown in FIGURE 3, the conduit 18, instead of returning into the conduit 15 as shown in FIGURES 1 and 2, may be itself branched, each branch 22 leading into a branch 14 of the inlet manifold 13 adjacent the outlet end of that branch.

Figure 4:
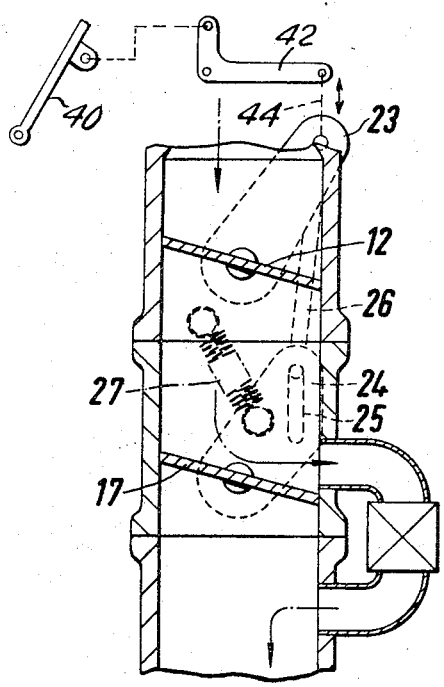
FIGURES 4, 5 and 6 are diagrams showing the means for controlling the throttle valves.
Figure 5:
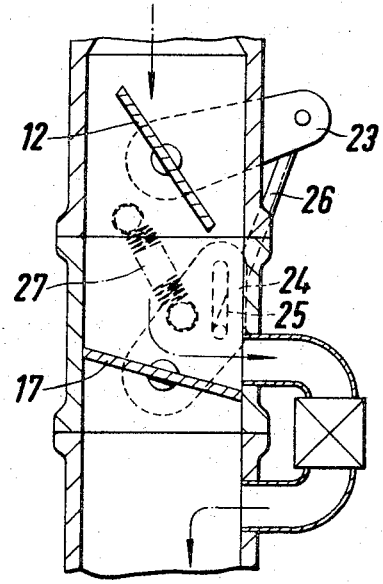
Figure 6:
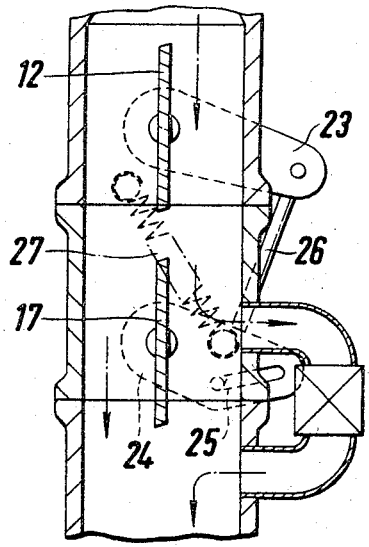

Referring to FIGURES 4, 5 and 6, the throttle valve 12 is actuated directly, by a suitable linkage 42 and 44 coupled to an accelerator pedal 40 or equivalent control member, and to a lever 23 fixed to the throttle valve spindle. The spindle of the throttle valve 17 carries a plate 24, slotted at 25, and a link 26 coupled at one end to the lever 23, has its other end slidable in the slot 25. A spring 27 acting on the plate 24 urges the throttle valve 17 to its closed position.

When the throttle control is in the throttle closed position, both throttle valves are closed as shown in FIGURE 4, and the link 26 engages in the slot 25 adjacent one end of the said slot, as shown in that figure. Initial movement of the throttle control opens the throttle valve 12, the link 26 sliding in the slot 25 until the position shown in FIGURE 5 is reached, at which position the throttle valve 12 is approaching its fully open position. The link 26 has then reached the other end of the slot 25. Up to this point, fuel/air mixture can flow only through the conduit 15 of smaller cross-section.

Further movement of the throttle control, as well as increasing the opening of the throttle valve 12, causes the throttle valve 17 to commence to open. The end of the slot 25 in the plate 24 which is now engaged by the link 25 is nearer to the axis of the throttle valve 17 than the point at which the link 25 is connected to the lever 23 is to the axis of the throttle valve 12, so the throttle valve 17 opens more rapidly than the throttle valve 12, and the two throttle valves come to their fully-open positions, shown in FIGURE 6, simultaneously. Between the throttle valve positions shown in FIGURES 5 and 6, fuel/air mixture flows through both conduits 15 and 18 to the engine cylinders.

Thus, the conduit 18 of smaller cross-section, with the branches 22 if provided, constitutes a primary conduit system through which the fuel/air mixture is passed for idling and low power operation, the said mixture being heated during its flow through this conduit system. The conduit 15 and the manifold 13 constitute a secondary conduit system which is opened only when higher power operation is required and provides, in combination with the primary conduit system, a total flow passage for the mixture of substantially greater cross-sectional area than does the primary conduit system alone.

Other dispositions of the two throttle valves may be employed to give the same effect as that described above. For example, as shown in FIGURE 7, where the larger inlet conduit is shown at 29 and the smaller inlet conduit at 31, a throttle valve 32 which corresponds to the throttle valve 12 in FIGURE 1 and controls the flow of air/fuel mixture in the conduit 31 is mounted in the conduit 29 downstream of the point where the conduit 31 re-enters the said conduit 29, and a throttle valve 33 which corresponds to the throttle valve 17 in FIGURE 1 and controls the flow of fuel/air mixture in the conduit 29 is mounted in that conduit between the points of exit and return of the conduit 31.

Figure 7:
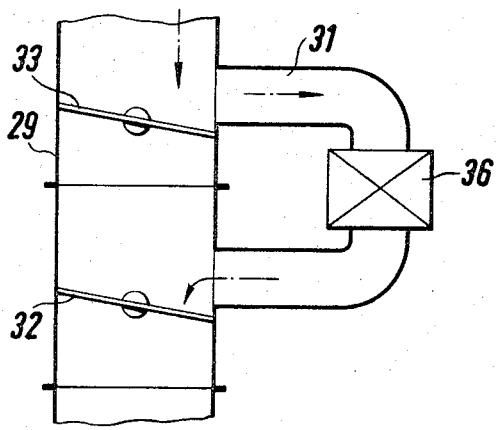
FIGURES 7, 8 and 9 are diagrams showing other modifications of the throttle valves in the conduit systems.
Figures 8, 9:
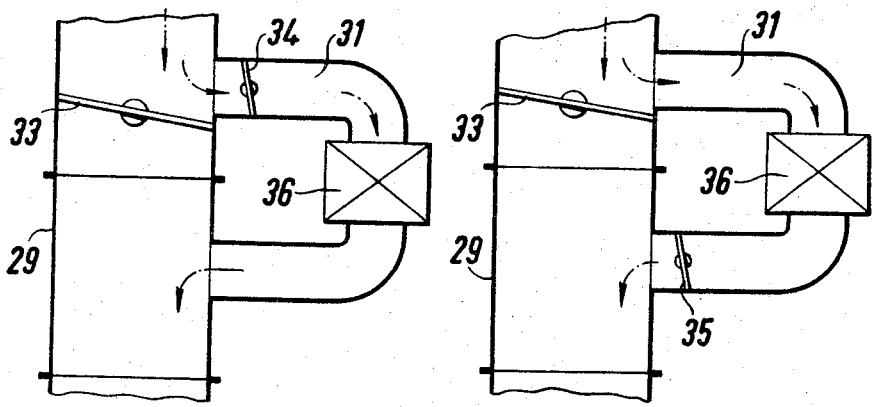

Moreover, as shown in FIGURES 8 and 9 respectively, the throttle valve 33 may be mounted in the conduit 29 as in FIGURE 7, but the flow of fuel/air mixture in the conduit 31 may be controlled by a throttle valve 34 (FIGURE 8) in that conduit close to the point where it branches from the conduit 29, or by a throttle valve 35 (FIGURE 9) in that conduit on the downstream side of the heating unit 36. When the throttle dispositions shown in FIGURES 7, 8 and 9 are used, the throttle valves are linked together in a manner similar to that shown in FIGURES 4 to 6.

The primary conduit system, due to its relatively small cross-section, causes the fuel/air mixture to flow relatively quickly when the quantity flowing is small, thus reducing the deposition of liquid fuel, and the heating of the mixture in this conduit assists vaporization and so further reduces deposition of liquid fuel. The primary conduit system, however, produces a relatively high pressure loss and provides a considerable heat input, both of which would have a deleterious effect in the output of the engine. The provision of the secondary conduit system, which is brought into use at large throttle openings, enables the primary conduit system to be by-passed when a high power output is required, the greater part of the mixture then passing through the said secondary conduit system so that the engine is able to produce its normal maximum output, the pressure loss being greatly reduced and the effect of the heating unit largely eliminated.

I claim:
1. An apparatus for supplying an air/fuel mixture from a carburetor system to an internal combustion engine, said apparatus comprising a primary conduit system and a secondary conduit system, said secondary conduit system adapted to connect the carburetor system to the engine, said primary system branching off from and returning to said secondary system, heating means in said primary conduit system for heating the air/fuel mixture passing therethrough, said secondary conduit system having a greater cross-sectional area than said primary conduit system, a first throttle means disposed in one of said conduit systems to control the flow of air/fuel mixture through said primary conduit system, a second throttle means disposed in said secondary conduit system between the points at which said primary conduit system branches from and returns to said secondary conduit system to control the flow of air/fuel mixture through said secondary conduit system, a control member movable from an idling position to a full throttle position, means directly operatively connecting said control member to said first throttle means to provide movement of said first throttle means from a closed to an open position in response to movement of said control means from said idling position to said full throttle position, a lost-motion connecting means operatively connecting said first throttle means and said second throttle means upon said first throttle means attaining a predetermined position between said closed and said open position, so that said second throttle means is opened during movement of said first throttle means from said predetermined position to said open position, and resilient means connected to said lost-motion connection means and normally urging same to a closed position during movement of said first throttle means from said closed to said predetermined position.

2. The improvement of claim 1, wherein said heating means is spaced from said secondary conduit system.

3. The improvement of claim 1, wherein said first throttle means is disposed in said primary conduit system.

4. The improvement of claim 1, wherein said first throttle means is disposed in said secondary conduit system.

References Cited

UNITED STATES PATENTS

| | | |
|---|---|---|
| 1,767,031 | 6/1930 | Worthington. |
| 2,807,448 | 9/1957 | Morton _____ 261—127 |

FOREIGN PATENTS

| | | |
|---|---|---|
| 100,991 | 8/1916 | Great Britain. |
| 192,794 | 2/1923 | Great Britain. |

HARRY B. THORNTON, *Primary Examiner.*

RONALD R. WEAVER, *Examiner.*

UNITED STATES PATENT OFFICE
CERTIFICATE OF CORRECTION

Patent No. 3,338,568            August 29, 1967

George Alexander Mangoletsi

It is hereby certified that error appears in the above numbered patent requiring correction and that the said Letters Patent should read as corrected below.

Column 4, line 34, for "same" read -- said second throttle means --.

Signed and sealed this 22nd day of October 1968.

(SEAL)
Attest:

Edward M. Fletcher, Jr.            EDWARD J. BRENNER
Attesting Officer            Commissioner of Patents